March 4, 1941.   R. G. JONES   2,234,124
PISTON STRUCTURE
Filed July 26, 1940
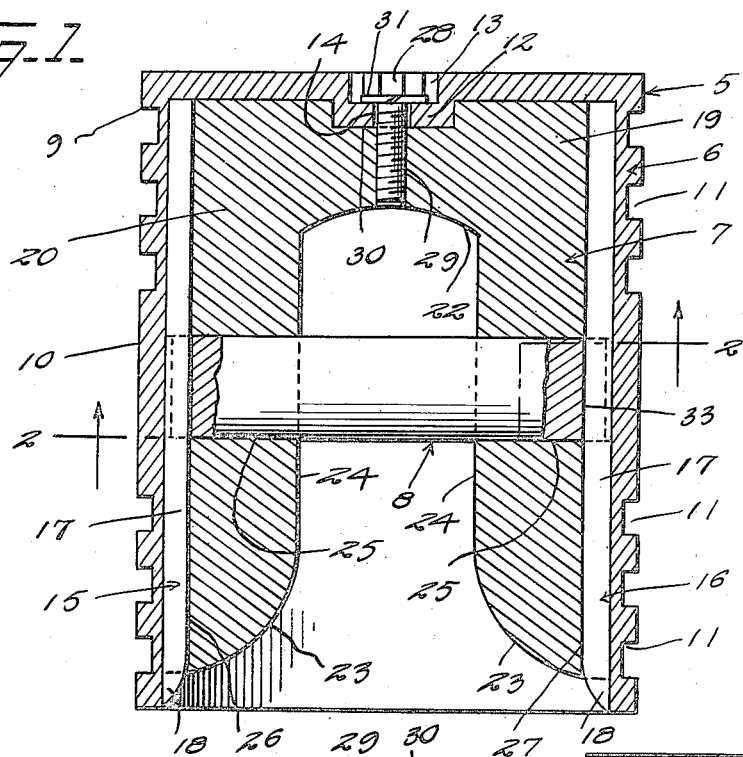
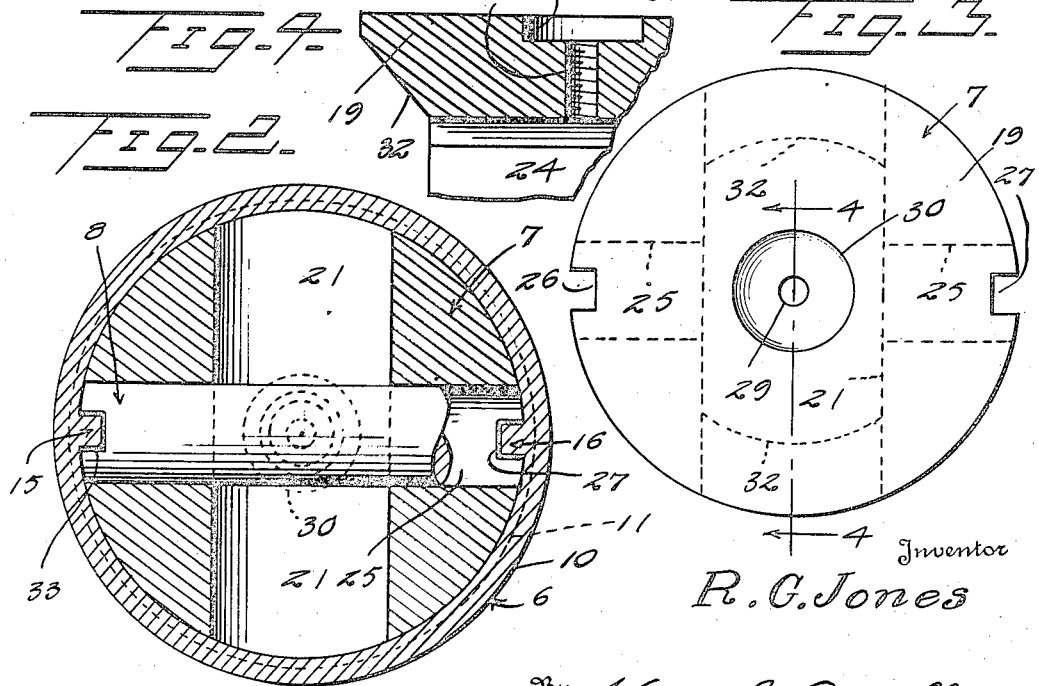
Inventor
R. G. Jones
By Kimmel & Crowell
Attorneys Patented Mar. 4, 1941

2,234,124

UNITED STATES PATENT OFFICE 2,234,124

PISTON STRUCTURE

Robert G. Jones, Chattanooga, Tenn.

Application July 26, 1940, Serial No. 347,812

5 Claims. (Cl. 309—16)

This invention relates to a reciprocatory piston structure designed primarily for use in connection with the internal combustion motors of automotive vehicles, but it is to be understood that a piston structure, in accordance with this invention is for employment in any connection for which it may be found applicable.

The invention aims to provide a piston structure so constructed as to enable one to conveniently and expeditiously remove and substitute piston rings without removing the oil pan of an automotive vehicle.

The invention further aims to provide, in a manner as hereinafter set forth, a piston structure whereby piston rings may be applied thereto without disconnecting the wrist pin from the piston structure, or disconnecting the connecting rod between the crank shaft and the wrist pin from the latter.

The invention further aims to provide a piston structure including a piston element, a wrist pin carrier and with said element and carrier so related and so constructed to provide for the removal of said piston element from the holder when it is desired to remove and replace rings relative to said element.

The invention further aims to provide a piston structure including a wrist pin carrier and a piston element encompassing said carrier, said element and carrier disposed coaxially and bodily moving in unison on the reciprocation of the piston structure, and with said structure including means for releasably connecting said element to the carrier to permit of the removal of said element from the carrier when occasion requires without disconnecting the wrist pin from the holder or the connecting rod leading to the crank shaft.

The invention further aims to provide, in a manner as hereinafter set forth, a piston structure so constructed to greatly facilitate the replacing of piston rings.

The invention further aims to provide a piston structure which is simple in its construction and arrangement, strong, durable, compact, readily assembled, thoroughly efficient for the purpose intended thereby, expeditiously disassembled to facilitate the replacing of piston rings and comparatively inexpensive to manufacture.

Embodying the aims aforesaid and others which may hereinafter appear, the invention consists of the novel construction, combination and arrangement of parts to be more specifically referred to and illustrated in the accompanying drawing, wherein is shown an embodiment of the invention, but it is to be understood that changes, variations and modifications may be resorted to which fall within the scope of the invention as claimed.

In the drawing:

Figure 1 is a vertical sectional view of the piston structure,

Figure 2 is a section on line 2—2 of Figure 1, and

Figure 3 is a top plan view of the wrist pin holder or carrier.

Figure 4 is a fragmentary view in vertical section taken at right angles to Figure 2.

With reference to the drawing, the piston structure generally indicated at 5 comprises a piston element 6, a wrist pin block, holder or carrier 7 and a wrist pin 8.

The element 6 is of cylindrical cross section, closed at its leading end and open at its follower end. The element 6 consists of a head 9 and a skirt-like body 10 having its outer periphery formed with two spaced sets of spaced piston ring receiving grooves 11. The head 9, centrally of its inner face, is formed with an integral circular offset portion, extension or boss 12. The head 9 axially thereof is provided with a recess 13, having its bottom formed by the top of said portion 12. The latter is of greater diameter than and is disposed coaxially with the recess 13. The portion 12 centrally thereof is formed with an opening 14, which extends from the bottom of recess 13 to the rear face of the portion 12.

The body 10 of the piston element 6 has integral with its inner face a pair of diametrically opposed keys 15, 16, having the major portions of their length, indicated at 17, of polygonal contour and their remaining portions, indicated at 18, tapered. The keys 15, 16, merge at their leading ends into the inner face of the head 9, and extend from such face to the follower end of body 10. The keys 15, 16, serve two functions, one for coupling the piston element 6 to the wrist pin block 7, holder or carrier, and the other a guide means for the piston element when the latter is to be disposed in and removed from encompassing relation with respect to said block, holder or carrier.

The wrist pin block, holder or carrier 7 will be hereinafter termed a carrier, and it is of circular cross section. The carrier 7 is formed of a recessed apertured leading portion 19, and a follower portion 20 of circular cross section. The portion 20 is of greater length than said portion 19. The latter, at its rear end, merges into the forward end of portion 20. The carrier 7 is of less length than piston element 6. The outer diameter of portions 19 are such as to provide a close sliding fit for element 6 when the latter is encompassing the carrier 7. The portion 20 is formed diametrically thereof with a lengthwise extending wide furcation 21 having a closed leading end 22, open sides and an open follower end. The furcation 21 is of less length than portion 20, and extends from a point in proximity to the forward end of such portion to the rear end of the latter. The sides of the furcation 21 open at the outer surface of portion 20. The rear parts 23 of the side walls 24 of the furcation 21, are oppositely flared to provide for the width of the open end of the furcation to be materially greater than the width of its forward portion. The portion 20 is formed intermediate its ends and diametrically thereof with a pair of spaced inner endwise aligned horizontal openings 25. Each opening 25 extends from the outer surface of portion 20 to and opens through a side wall 24 into the furcation 21. The carrier 7 is formed on its outer surface and lengthwise thereof, with a pair of diametrically opposed outwardly opening channels or grooves 26, 27. The channels 26, 27, are open at each end, are intersected by the openings 25, and extend from the leading end of the carrier 7 to the follower end of the latter. The cross sectional contour of the channels corresponds to the cross sectional contour of the keys. When the piston element 6 is arranged in encompassing relation with respect to the carrier 7, the keys 15 and 16 are disposed throughout the channels, whereby the coaction of the keys with the walls of the channels prevents the revolving of the piston element and carrier relative to each other.

The piston element and carrier are detachably connected together, and when so connected the leading end of the carrier is disposed in abutting relation with respect to the inner face of the head 9 of element 6. For this purpose a headed clamping screw or bolt 28 is employed, and the leading end of the carrier 7 is provided with an axially disposed threaded opening 29 and a centrally arranged pocket 30. The latter is arranged in and axially of the leading end of portion 19. The opening 29 communicates with pocket 30, and extends from the base of pocket 30 to the closed end 22 of the furcation 21. When element 6 is mounted in surrounding relation with respect to the carrier 6, the extension 12 engages in pocket 30, and the opening 14 aligns with the opening 29. The screw or bolt 28 is mounted in recess 13, and its shank is passed through opening 14 and threadedly engages the wall of opening 30, whereby element 6 and carrier 7 are detachably clamped together in abutting relation, and when so clamped the keys 15, 16, extend through the channels 26, 27. There is interposed between the head of the screw or bolt 28 and the base of recess 13 a washer 31. The recess 13 is of such depth whereby when the screw or bolt is in clamping position, the head of the latter will not project beyond the leading face of head 9. The portion 19 constitutes a support for the head of the piston, and at diametrically opposite points thereof it is formed with oppositely disposed beveled undercuts 32 extending inwardly from a point rearwardly of the leading end of the carrier 7 to the end wall 22 of the furcation. The undercuts reduce the weight of the leading end of the carrier.

The wrist pin 8 is mounted in and snugly engages the walls of the openings 25, and also extends across the furcation 21. The length of wrist pin 8 is such that its ends will be flush with the outer face of the portion 20 of the carrier 7. The outer ends of the wrist pin 8 conform in contour to the outer surface of carrier portion 20, and such ends are formed diametrically thereof with grooves 33, which complete the channels at the intersected portion of the latter and receives portions of the keys 15, 16.

It is obvious that the construction of the elements 6, 7 and 8, as well as their correlation attains the aims aforesaid of the invention.

What I claim is:

1. A piston structure comprising a piston element, a carrier within and interengaging with said element, said carrier being formed with a furcation, a wrist pin mounted in the carrier, extended across the furcation and interengaging with said element, means for detachably securing said element and carrier together, and said carrier formed with oppositely disposed grooves on its outer periphery, said wrist pin formed with oppositely disposed grooves on its ends, and said element formed with oppositely disposed internal keys engaging in the grooves of the carrier and wrist pin.

2. A piston structure comprising a carrier formed with a furcation lengthwise thereof, a piston element slidably mounted upon and interengaging with the carrier, means for detachably connecting the carrier and element in abutting relation, a wrist pin mounted in the carrier, extending across the furcation and interengaging with said element, and said carrier formed with oppositely disposed grooves on its outer periphery, said wrist pin formed with oppositely disposed grooves on its ends, and said element formed with oppositely disposed internal keys engaging in the grooves of the carrier and wrist pin.

3. In a piston structure a carrier, a piston element of the skirt type disposed in encompassing relation with respect to and slidably removable from the carrier, means at the leading ends of said carrier and element for detachably securing them together to thereby provide for their bodily moving in unison, said carrier formed lengthwise thereof with a furcation, a wrist pin mounted in the carrier and extending across the furcation, and said carrier, element and wrist pin having correlated means to prevent the revolving of the wrist pin relative to the carrier and the revolving of the carrier and element relatively to each other.

4. The invention as set forth by claim 3 having the correlated means of the carrier being in its outer periphery, the correlated means of the piston element being extended from its inner face, and the correlated means of the wrist pin being in its ends.

5. In a piston structure a bifurcated carrier having its leading end formed axially thereof with a forwardly opening pocket and a threaded opening disposed coaxially with and leading rearwardly from the base of the pocket, a piston element including a head and a skirt, the latter encompassing said carrier, said head axially thereof being formed with a forwardly opening recess and an opening disposed coaxially with and leading rearwardly from the base of the recess, said openings endwise aligning, a wrist pin mounted in said carrier and extending across said furcation, means correlated with said pocket, recess and openings for detachably securing said carrier and element in abutting relation, said element being slidable off of said carrier, said carrier, element and wrist pin having coacting means to prevent the wrist pin from revolving relative to the carrier and the element and carrier revolving relatively to each other, and said coacting means providing a guide when positioning said element in and when removing it from encompassing relation with respect to the carrier.

ROBERT G. JONES.